US000001021H

United States Statutory Invention Registration [19]

[11] Reg. Number: H1021

Machado et al. [43] Published: Feb. 4, 1992

[54] REINFORCED POLYMER BLENDS

[75] Inventors: Joseph M. Machado, Richmond; William P. Gergen, Houston, both of Tex.

[73] Assignee: Shell Oil Company, Houston, Tex.

[21] Appl. No.: 429,447

[22] Filed: Oct. 31, 1989

[51] Int. Cl.[5] ..... C08K 3/40
[52] U.S. Cl. ..... 524/494; 524/514
[58] Field of Search ..... 524/538, 514

[56] References Cited

U.S. PATENT DOCUMENTS

| | | | |
|---|---|---|---|
| 3,694,412 | 9/1972 | Nozaki | 260/63 CQ |
| 4,174,358 | 11/1979 | Epstein | 525/183 |
| 4,404,312 | 9/1983 | Kokubu et al. | 524/514 |
| 4,839,437 | 6/1989 | Gergen et al. | 525/426 |
| 4,874,819 | 10/1989 | George et al. | 525/185 |

FOREIGN PATENT DOCUMENTS

| | | |
|---|---|---|
| 121965 | 10/1984 | European Pat. Off. . |
| 257663 | 3/1988 | European Pat. Off. . |

*Primary Examiner*—Richard D. Lovering
*Assistant Examiner*—Joseph D. Anthony

[57] ABSTRACT

Improved mechanical properties, particularly tensile strength, are demonstrated by glass fiber-reinforced blends of a polymeric blend comprising a major proportion of a polyamide polymer with a lesser amount of a linear alternating polymer of carbon monoxide and at least one ethylenically unsaturated hydrocarbon and, optionally, an acidic polymer containing moieties of $\alpha$-olefin and $\alpha,\beta$-ethylenically unsaturated carboxylic acid.

23 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

REINFORCED POLYMER BLENDS

FIELD OF THE INVENTION

This invention relates to a polymer blend comprising predominately a polyamide polymer having recurring amide linkages within the polymer chain, which blend is reinforced by the presence therein of glass fibers. More particularly, the invention relates to a reinforced blend of the polyamide polymer with a lesser amount of a linear alternating polymer of at least one ethylenically unsaturated hydrocarbon and, optionally, a lesser proportion of an acidic polymer containing moieties of an $\alpha$-olefin and an $\alpha,\beta$-ethylenically unsaturated carboxylic acid.

BACKGROUND OF THE INVENTION

The class of polyamide polymers which is the major polymeric component of the blends of the invention has been known for many years. These polymers, also known as Nylons, have gained extensive commercial recognition in the production of numerous types of objects produced by many of the methods conventional for the processing of such thermoplastic polymers. Although the polyamides are useful in the formation of three-dimensional objects such as gears and motor housings, the most frequent use is probably in the production of fibers and filaments and the yarns and fabrics produced therefrom. There are, however, certain limitations imposed by the properties of the polyamide polymers which limit their usage in some applications. It would be of advantage to retain the more desirable properties of the polyamide polymers and yet improve other properties, particularly when the polyamide polymers are to be reinforced as by the presence of reinforcing materials such as glass fibers. These advantages are often obtained through the provision of polymer blends.

Blends of polyamide polymers are known wherein the properties of the polyamide have been modified. For example, Epstein, U.S. Pat. No. 4,174,358, describes blends of a number of polymers in a polyamide matrix which are said to show improved ductility and toughness. Blends wherein the polyamide polymer is a major or component with lesser amounts of the linear alternating polymer of carbon monoxide and at least one ethylenically unsaturated hydrocarbon and an acidic polymer are disclosed by copending U.S. patent application Ser. No. 429,915, filed Oct. 31, 1989.

Blends wherein the polyamide polymer is a minor component with a major proportion of the linear alternating polymer are disclosed in U.S. Pat. No. 4,839,437. Such blends additionally containing an acidic polymer having moieties of $\alpha$-olefin and $\alpha,\beta$-ethylenically unsaturated carboxylic acid are disclosed in copending U.S. patent application Ser. No. 429,913, filed Oct. 31, 1989. The presence of these minor components serves to improve certain of the properties of the linear alternating polymer. It has now been found that reinforced polymeric blends wherein the polyamide polymer is the major component demonstrate improvement in certain properties upon blending with the linear alternating polymer and, optionally, with the acidic polymers.

SUMMARY OF THE INVENTION

The present invention provides blends of polyamide polymers with lesser proportions of other polymeric material, which blends are reinforced by the presence therein of glass fibers. More particularly, the invention provides reinforced blends comprising major amounts of polyamide polymer with lesser amounts of a linear alternating polymer of carbon monoxide and at least one ethylenically unsaturated hydrocarbon and, optionally, an acidic polymer containing moieties of an $\alpha$-olefin, and an $\alpha,\beta$-ethylenically unsaturated carboxylic acid, and an optional third monomer, which acidic polymer optionally has a portion of the carboxylic acid groups neutralized with non-alkali metal. The blends of the invention exhibit improved fiber-matrix adhesion and improved tensile strength.

DESCRIPTION OF THE INVENTION

The major polymeric component of the blends of the invention is a polyamide polymer. By the term "polyamide" as used herein is meant a linear condensation product containing recurring amide linkages as integral parts of the polymeric chain. These polyamide polymers are well known in the art and a number have been marketed commercially under the trademark Nylon. The polyamide polymers which are useful in the blends of the invention are crystalline or amorphous polymers of linear or branched structure and have a molecular weight of at least 5000. The preferred polyamide polymers are linear in structure, wherein each recurring unit has up to 16 carbon atoms inclusive, and the polyamide polymers have melting points in excess of about 200° C.

In one embodiment of the polyamide blend component the polyamide is homopolymeric in character illustratively being a homopolymer of an aminocarboxylic acid of up to 16 carbon atoms inclusive. In preferred homopolymeric polyamide polymers the polymeric unit can be thought of as derived from a straight-chain omega-aminocarboxylic acid of up to 16 carbon atoms inclusive. It should be appreciated that the representation of the polyamide polymer of this embodiment as the homopolymer of aminocarboxylic acid is for convenience and in practice the monomeric unit is provided as an aminocarboxylic acid, a lactam or in an equivalent form. Typically, the homopolymeric monomeric unit is provided as a lactam, e.g., butyrolactam,. caprolactam or lauryllactam. These homopolymeric polyamides are often referred to in terms of the number of carbon atoms in the monomeric unit. For example, the polyamide obtained from polymerization of butyrolactam is termed Nylon 4 and the homopolyamide obtained by polymerization of caprolactam is termed Nylon 6. Of these homopolymeric materials, the polyamide preferred for use as a component of the blends of the invention is polycaprolactam or Nylon 6.

In an alternate embodiment of the polyamide blend component the polyamide is copolymeric in character and is illustratively represented as a condensation product of a primary diamine and a dicarboxylic acid. The primary diamine is preferably a terminal primary or alpha,omega primary diamine of up to 16 carbon atoms inclusive and having at least two carbon atoms located between the primary amino groups located on terminal carbon atoms of the diamine structure. The diamines suitably contain aromatic moieties linking the two primary amino groups as illustrated by p-phenylenediamine, 4,4'-diaminobiphenyl, di(4-aminophenyl)methane and di(4-aminophenyl) ether, or the diamines contain cycloaliphatic linking groups as in the case of di(4-aminocyclohexyl)methane or 1,4-diaminocyclooctane. The preferred diamines, however, are the acyclic terminal primary diamines of the formula $$H_2N\text{-}(CH_2)_n\text{-}NH_2 \quad (I)$$

wherein n is an integer from 2 to 16 inclusive. Such polymethylenediamines include trimethylenediamine, tetramethylenediamine, hexamethylenediamine, decamethylenediamine, dodecamethylenediamine and hexamethylenediamine. Of these diamines, the use of hexamethylenediamine as precursor of the copolymeric polyamide blend component is preferred.

The dicarboxylic acid precursor of the copolymeric polyamide blend component has up to 16 carbon atoms inclusive, preferably up to 12 carbon atoms inclusive, and is illustrated by aromatic dicarboxylic acids such as isophthalic acid, terephthalic acid, 4,4'-biphenyldicarboxylic acid and 2,6-naphthalenedicarboxylic acid, or by cycloaliphatic dicarboxylic acids such as 1,4-cyclohexanedicarboxylic acid, 1,5-cyclooctanedicarboxylic acid and 2,3-norbornanedicarboxylic acid. The preferred dicarboxylic acids, however, are acyclic aliphatic dicarboxylic acids, particularly those straight-chain dicarboxylic acids of the formula $$HO_2C\text{-}(CH)_m\text{-}CO_2H \quad (II)$$

wherein m is an integer from 0 to 14 inclusive, preferably from 0 to 10 inclusive. Illustrative of such dicarboxylic acids are oxalic acid, pimelic acid, sebacic acid, suberic acid, adipic acid and azelaic acid. Of the acyclic aliphatic dicarboxylic acids, adipic acid is particularly preferred.

It should be appreciated that the copolymeric polyamides are represented as the condensation product of primary diamines and dicarboxylic acid monomer or even the primary diamine may suitably be provided in an equivalent form. For example, the dicarboxylic acid precursor of the copolymeric polyamide is often provided as the dialkyl ester of the dicarboxylic acid. The copolymeric polyamides are also often named in terms of the number of carbon atoms in the monomeric units, i.e., the number of carbon atoms in the diamine and the dicarboxylic acid monomers. For example, the copolymeric polyamide illustratively produced from hexamethylenediamine and adipic acid is termed Nylon 6,6. The copolymeric polyamide illustratively produced from tetramethylenediamine and dodecanedicarboxylic acid is termed Nylon 4,12.

The polyamide blend components, whether homopolymeric or copolymeric, are well known materials and many polyamide polymers are commercially available from DuPont and others. The production of the polyamide polymers is well known and conventional.

The blends of the invention comprise the polyamide component in major proportion and lesser proportions of linear alternating polymer of carbon monoxide and at least one ethylenically unsaturated hydrocarbon and, optionally, an acidic polymer containing moieties of an α-olefin and an α,β-ethylenically unsaturated carboxylic acid, which blends are reinforced by the presence therein of glass fibers. The linear alternating polymers, now becoming known as polyketones or polyketone polymers, have a repeating unit of the general formula $$-\overset{O}{\overset{\|}{C}}\text{-}(A)\text{-}$$

wherein A is the moiety of ethylenically unsaturated hydrocarbon polymerized through the ethylenic unsaturation. A variety of ethylenically unsaturated hyrocarbons of up to 20 carbon atoms inclusive, preferably of up to 10 carbon atoms inclusive, are useful in the production of the linear alternating polymer. Illustrative of such hydrocarbons are ethylene, butylene, isobutylene, styrene, 1-octene and 1-dodecene. The preferred linear alternating polymers are copolymers of carbon monoxide and ethylene and terpolymers of carbon monoxide, ethylene and a second ethylenically unsaturated hydrocarbon of at least 3 carbon atoms, particularly an α-olefin such as propylene.

The preferred polyketone polymers for use as a component of the blends of the invention are represented by the repeating formula $$[CO\text{-}(CH_2\text{—}CH_2)]\,[CO\text{-}(G)]_y \quad (III)$$

wherein G is a moiety of the second ethylenically unsaturated hydrocarbon of at least 3 carbon atoms, particularly propylene, polymerized through the ethylenic unsaturation thereof. The $\text{—}CO\text{-}(CH_2CH_2)\text{-}$ units and the $\text{—}CO\text{-}(G)\text{-}$ units are found randomly throughout the polymeric chain and the ratio of y:x is no more than 0.5. In the embodiment where linear alternating copolymers are employed as the blend component there will be no second hydrocarbon present and the copolymers are represented by the above formula III wherein y is zero. When terpolymers are employed in the blends of the invention, the terpolymers are of the above formula wherein y is greater than zero and the ratio o! y:x is from about 0.01 to about 0.1.

The preferred polyketone polymers will typically have a number average molecular weight, as determined by gel permeation chromatography of from about 1000 to about 200,000, but more often from about 20,000 to about 90,000. The polymers will have a melting point of from about 175° C. to about 300° C. and a limiting viscosity number (LVN), measured in m-cresol at 60° C. in a standard capillary viscosiity measuring device, of from about 0.8 dl/g to about 4 dl/g. The linear alternating polymers are produced by contacting the carbon monoxide and ethylenically unsaturated hydrocarbon reactants in the presence of a catalyst composition formed from a compound of palladium cobalt or nickel, the anion of a non-hydrohalogenic acid having a pKa below about 6, preferably below 2, and a bidentate ligand of phosphorus, arsenic or antimony. The scope of the polymerization process is extensive but, without wishing to be limited, a preferred catalyst composition is formed from a palladium alkanoate, particularly palladium acetate, the anion of trifluoroacetic acid or p-toluenesulfonic acid, and a bidentatc ligand of phosphorus selected from 1,3-bis(diphenylphosphino)-propane or 1,3-bis[di(2-methoxyphenyl)phosphino]propane. The general processes for the production of the linear alternating polymer is illustrated by a number of published European Patent Applications including 121,965, 181,014, 213,671 and 257,663.

The polyketone polymer is employed in the blends of the invention as a minor component relative to the polyamide polymer. Amounts of polyketone polymer as low as 1% by weight, based on total polymeric blend, will be of benefit. On the other hand, the production of blends having more than about 20% by weight of polyketone and a major or proportion of polyamide is difficult so that about 20% by weight of polyketone in a major proportion of polyamide polymer represents a practical upper limit on the proportion of polyketone polymer blend component. Preferred quantities of polyketone are from about 5% by weight to about 15% by weight of polyketone based on total polymer blend.

The optional third polymeric component of the blends of the invention is an acidic polymer of an α-olefin and α,β-ethylenically unsaturated carboxylic acid, optionally containing a third monomer and optionally having a portion of the carboxylic acid groups neutralized with non-alkali metal. The α-olefin precursor of the optional third polymeric blend component is an α-olefin of up to 10 carbon atoms inclusive as illustrated by ethylene, propylene, 1-butene, isobutylene, 1-octene and 1-decene. The preferred α-olefins are straight-chain α-olefins of up to 4 carbon atoms inclusive and particularly preferred is ethylene. The α-olefin component of the optional third polymeric blend component is present in a quantity of at least about 65% by mole of any third polymeric blend component and is preferably present in at least 80% by mole on the same basis.

The unsaturated carboxylic acid monomer of the optional third polymeric blend component is an α,β-ethylenically unsaturated carboxylic acid of up to 10 carbon atoms inclusive and is illustrated by acrylic acid, 2-hexenoic acid, 2-octenoic acid and 2-decenoic acid. The preferred α,β-ethylenically unsaturated carboxylic acids have up to 4 carbon atoms inclusive. These acids are acrylic acid, methacrylic acid and crotonic acid, of which acrylic acid and methacrylic acid are particularly preferred. The unsaturated acid monomer of the optional third polymeric blend component is present in an amount of from about 1% by mole to about 5% by mole, based on total acidic polymer, but amounts of unsaturated carboxylic acid from about 5% by mole to about 20% by mole on the same basis are preferred.

The optional acidic polymer blend component is suitably a copolymer of the α-olefin and the α,β-ethylenically unsaturated carboxylic acid and in general such copolymers are preferred. On occasion, however, it is useful to incorporate within the acidic polymer as an optional third monomer a non-acidic, low molecular weight polymerizable monomer of up to 8 carbon atoms inclusive. Such optional third monomer may be a second α-olefin such as propylene or styrene when the major α-olefin is ethylene, an unsaturated ester such as vinyl acetate, methyl acrylate or ethyl methacrylate, an unsaturated halohydrocarbon such as vinyl fluoride or vinyl chloride, or an unsaturated nitrile such as acrylonitrile. As previously stated, the presence of a third monomer is optional and is not required. Amounts of the non-acidic low molecular weight polymerizable monomer up to about 5% by mole, based on total acidic polymer are satisfactory with amounts up to about 3% by mole on the same basis being preferred.

Independent of whether the acidic polymer employed as an optional third polymeric blend component is a copolymer or a terpolymer, in an alternate embodiment of this optional blend component a portion of the acidic carboxylic acid groups are neutralized with non-alkali metal. When partially neutralized, the blend component is polymeric in form while exhibiting ionic character and these materials are conventionally referred to as metal ionomers. In the partially neutralized embodiment, the α-olefin/unsaturated acid polymer with or without the presence of the optional third monomer, is reacted with a source of ionizable non-alkali metal compound, preferably ionizable zinc, aluminum or magnesium compound, sufficient to neutralize from about 10% to about 90% of the carboxylic acid groups present in the polymer. Such neutralization, particularly with zinc, the preferred metal, results in a uniform distribution of metal through the polymer. Neutralization of from about 20% to about 80% of the carboxylic acid groups present is preferred in this embodiment and neutralization of from about 25% to about 75% of the carboxylic acid groups is particularly preferred. The ionizable metal compound utilized in the neutralization is a source of uncomplexed non-alkali metal ions including zinc ions, aluminum ions or magnesium ions which are provided in the form of compounds of the type referred to as metal salts, e.g., zinc acetate, zinc formate or zinc propionate, or is a source of complexed metal ions wherein the metal is bonded to two types of groups, at least one of which is readily ionized and at least one other group is not. Illustrative of such complexed metal ions are mixed zinc salts with one weak acid such as oleic acid or stearic acid and one more readily ionizable acid such as acetic acid or formic acid. In general, neutralization with a complexed metal ion is preferred in this embodiment.

The acidic polymers employed as optional third polymeric blend components, optionally partially neutralized, are conventional and well known and many are commercial. Copolymers of ethylene and acrylic acid are marketed by Dow under the trademark PRIMACORE ® and copolymers of ethylene and methacrylic acid are marketed by DuPont under the trademark NUCREL ®. Partially neutralized polymers are marketed by DuPont under the trademark SURLYN ®. As stated, the presence of acidic polymer is optional and none is required. Amount of the optional third polymeric blend component up to about 10% by weight, based on total blend, are satisfactory. Amounts up to about 5% by weight on the same basis are preferred.

The polymeric blends of the invention are reinforced by the presence therein of glass fibers. The term "glass" is employed in the conventional meaning to indicate that class of metal silicates which are commonly referred to as glasses. Although the addition of rare earth metal oxides or transition metal oxides to other metal silicates will on occasion produce a glass of rather exotic properties, the glass from which the glass fiber reinforcement of the blends of the invention is produced is the more common alkali metal silicate glass, particularly a sodium silicate glass. Fibers produced from such glass are conventional and are commercially available from a number of U.S. and foreign glass companies. The fibers are useful as reinforcements for polymeric products and are commercially used as such. However, the physical dimensions of the glass fibers are of some importance to successful utilization in a particular application as are the presence or absence of a sizing material or a coupling agent for the glass and the nature of such sizing or coupling agent.

In the reinforced blends of the invention, the glass fibers which contribute the most desirable properties to the composition are chopped glass fibers of circular cross-section. The fibers range in diameter from about $2\times10^{-4}$ inch to about $8\times10^{-4}$ inch to about $7\times10^{-4}$ inch. Fibers of greater or lesser diameter are satisfactory but fibers of too small a diameter do not provide the desired strength and fibers of too large a diameter contribute too much weight for the resulting strength and may not be economical. Although in some applications the long continuous fibers of glass are satisfactory, in the compositions of the invention it is preferred to use short fibers of glass. Lengths of glass fiber from about 0.1 inch to about 0.5 inch are suitable. While somewhat shorter or somewhat longer lengths are also useful, too long a glass fiber detracts from the processability while too short a fiber does not provide the desired strength. It is recognized that the actual length of the glass fiber in the reinforced composition will depend to some extent upon the method of blending or mixing the components as the mixing or blending may mechanically reduce the length of the glass fibers.

The glass fibers to be used as reinforcement for most plastic materials will customarily be provided by the manufacturer with a coating of a sizing material or a coupling agent, which terms are often used interchangeably. The nature of the sizing or coupling agent will influence the interfacial strength of the fiber and the polyamide polymer matrix, i.e., the degree to which the fiber and the polymer will adhere. Improvement in mechanical properties such as tensile strength result when a relatively high degree of adhesion occurs between the polymer and the fiber. To contribute strength to a polymer blend, the interfacial shear strength must he at least comparable in magnitude to the shear strength of the polymer. Consequently, there must be good adhesion between the polymer and the glass fiber. The interfacial shear strength is influenced by the polarity of the polymer so that for some polymers certain sizings or coupling agents work better than others. For use with the polymeric blends of the invention, a variety of sizings are available. Such sizings are generally characterized by the overall nature of the size rather than the specific chemical structures which are often proprietary to the glass fiber manufacturer. Suitable sizing include water emulsions of starch and lubricating oil, aqueous dispersions of surface active materials and lubricants, silicon-containing materials such as vinyl silanes, alkyltrimethoxysilanes, amino silanes, trimethoxysilanes which may also contain urethane, acrylate or epoxy functionalities, and non-polar hydrocarbons. For use in the reinforced blends of the invention, glass fibers having polar sizings are preferred, for example, a sizing having a trimethoxysilane end group attached to a hydrocarbon chain with a terminal methane functionality, although other hydrocarbon sizings having a trimethoxysilane end group are also suitable. Such fibers are commercially available and are exemplified by OCF 492 Fiberglass and OCF 457 Fiberglass which are commercially available from Owens-Corning Fiberglass.

The amount of glass fiber to be incorporated into the compositions of the invention is a minor amount relative to the polymer present as the major component of the total reinforced composition. Amounts of glass fiber from about 1% by weight to about 45% by weight, based on total reinforced composition, are satisfactory with amounts from about 5% to about 35% by weight on the same basis being preferred.

The method of producing the compositions of the invention is not critical so long as an intimate mixture of the components is produced, i.e., a uniform mixture which will not delaminate on processing. In one modification, the components are blended by passing a mixture of the polymeric blend components in finely divided form and the glass fibers through an extruder operating at elevated temperature and high RPM to produce the blend as an extrudate. In an alternate modification, the components are blended in a mixing device operating at high shear and thermal energy. The reinforced compositions of the invention may contain other materials such as antioxidants, stabilizers, mold release agents, fire retardant chemicals and other materials which are designed to improve the processability of the polymeric blend components or modify the properties of the reinforced composition. Such additives are incorporated prior to, together with or subsequent to the blending of the components and the mixing with the glass fibers. The resulting compositions are processed by conventional methods such as injection molding, pressure forming, sheet extrusion and other procedures which do not serve to degrade the reinforced composition. The polymer/fiber glass composition are uniform blends which exhibit less mold shrinkage and have improved mechanical properties, particularly tensile strength. The compositions have particular utility in the production of mechanical parts, e.g., automobile body panels and fenders, especially those having a large and continuous surface where toughness, strength and appearance are important.

What is claimed is:

1. A fiberglass-reinforced polymer blend comprising a major proportion of a polyamide polymer containing recurring amide linkages as integral parts of the polymer chain and a molecular weight of at least 5000, and a minor proportion of linear alternating polymer of carbon monoxide and at least one ethylenically unsaturated hydrocarbon and, optionally, an acidic polymer contaiing moieties of $\alpha$-olefin, $\alpha,\beta$-ethylenically unsaturated carboxylic acid and optionally a non-acidic, low molecular weight polymerizable third monomer of up to 8 carbon atoms, which acidic polymer optionally has a portion of the carboxylic acid groups neutralized with non-alkali metal.

2. The reinforced blend of claim 1 wherein the linear alternating polymer is represented by the repeating formula $$\left[CO\left(CH_2-CH_2\right)\right]\left[CO\left(G\right)\right]_y$$

wherein G is a moiety of an ethylenically unsaturated hydrocarbon of at least 3 carbon atoms and the ratio of y:x is no more than about 0.5.

3. The reinforced blend of claim 2 wherein the acidic polymer is a copolymer of ethylene and acrylic acid or methacrylic acid, present in an amount of up to about 10% by weight, based on total blend.

4. The reinforced blend of claim 3 wherein glass fiber is present in an amount of from about 1% by weight to about 45% by weight, based on total reinforced composition.

5. The reinforced blend of claim 4 wherein the polyamide polymer is homopolymeric having a recurring unit of up to 16 carbon atoms inclusive.

6. The reinforced blend of claim 5 wherein y is zero.

7. The reinforced blend of claim 5 wherein the ratio of y:x is from about 0.01 % to about 0.1.

8. The reinforced blend of claim 7 wherein the linear alternating polymer is present in an amount from about 1% by weight to about 20% by weight, based on total polymeric blend.

9. The reinforced blend of claim 8 wherein the polyamide polymer is polycaprolactam.

10. The reinforced blend of claim 9 wherein G is a moiety of propylene.

11. The reinforced blend of claim 10 wherein the acidic polymer is a non-neutralized copolymer of ethylene and acrylic acid.

12. The reinforced blend of claim 10 wherein th acidic polymer is a non-neutralized copolymer of ethylene and methacrylic acid.

13. The reinforced blend of claim 4 wherein the polyamide polymer is copolymeric of recurring units of primary diamine and dicarboxylic acid of up to 16 carbon atoms inclusive.

14. The reinforced blend of claim 13 wherein the primary diamine is of the formula $$H_2N\text{-}(CH_2)_n\text{-}NH_2$$

wherein n is an integer from 2 to 16 inclusive.

15. The reinforced blend of claim 14 wherein the dicarboxylic acid is of the formula $$HO_2C\text{-}(CH_2)_m\text{-}CO_2H$$

wherein m is an integer from 0 to 14.

16. The reinforced blend of claim 15 wherein y is zero.

17. The reinforced blend of claim 15 wherein the ratio of y:x is from about 0.01 to about 0.1.

18. The reinforced blend of claim 17 wherein the linear alternating polymer is present in an amount from about 1% by weight to about 20% by weight, based on total polymeric blend.

19. The reinforced blend of claim 18 wherein the primary diamine is hexamethylenediamine.

20. The reinforced blend of claim 19 wherein the dicarboxylic acid is adipic acid.

21. The reinforced blend of claim 20 wherein G is a moiety of propylene.

22. The reinforced blend of claim 21 wherein the acidic polymer is a non-neutralized copolymer of ethylene and acrylic acid.

23. The reinforced blend of claim 21 wherein the acid polymer is a copolymer of ethylene and methacrylic acid.

* * * * *